United States Patent
Calvin et al.

(10) Patent No.: US 9,223,892 B2
(45) Date of Patent: Dec. 29, 2015

(54) DEVICE ABSTRACTION FOR PAGE GENERATION

(75) Inventors: Phil N. Calvin, San Francisco, CA (US); Brian Zotter, Danville, CA (US); Eric G. Dorgelo, Vancouver (CA)

(73) Assignee: salesforce.com, inc., San Francisco, CA (US)

( * ) Notice: Subject to any disclaimer, the term of this patent is extended or adjusted under 35 U.S.C. 154(b) by 1062 days.

(21) Appl. No.: 13/248,472

(22) Filed: Sep. 29, 2011

(65) Prior Publication Data

US 2012/0084403 A1    Apr. 5, 2012

Related U.S. Application Data

(63) Continuation-in-part of application No. 12/935,890, filed on Sep. 30, 2010, now Pat. No. 8,762,938.

(60) Provisional application No. 61/419,611, filed on Dec. 3, 2010.

(51) Int. Cl.
| | |
|---|---|
| *G06F 15/16* | (2006.01) |
| *G06F 17/30* | (2006.01) |
| *H04W 4/20* | (2009.01) |
| *H04L 29/08* | (2006.01) |

(52) U.S. Cl.
CPC .......... *G06F 17/30893* (2013.01); *H04L 67/02* (2013.01); *H04W 4/206* (2013.01)

(58) Field of Classification Search
CPC .......................... H04L 29/06; H04L 29/08072
USPC ...................... 709/219, 238, 220, 246; 703/13
See application file for complete search history.

(56) References Cited

U.S. PATENT DOCUMENTS

| | | | |
|---|---|---|---|
| 5,388,214 | A | 2/1995 | Leiserson et al. |
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |

(Continued)

FOREIGN PATENT DOCUMENTS

| | | |
|---|---|---|
| WO | WO-2005062211 | 7/2005 |
| WO | WO-2007092373 | 8/2007 |

OTHER PUBLICATIONS

Office Action for Canadian Patent Application No. 2,720,897 mailed Jan. 18, 2013, 3 pages.

(Continued)

*Primary Examiner* — Khanh Dinh
(74) *Attorney, Agent, or Firm* — Blakely, Sokoloff, Taylor & Zafman

(57) ABSTRACT

Device Abstraction for Page Generation. A request is received for information to be provided as a page of content, the page provided by a server device to a remote requesting device. The page of content is dynamically constructed in response to the request based on metadata stored on the server device and context information corresponding to the request. The dynamically constructed page of content is transmitted to the requesting device.

24 Claims, 6 Drawing Sheets

(56) References Cited

U.S. PATENT DOCUMENTS

| | | | |
|---|---|---|---|
| 5,963,953 A | 10/1999 | Cram et al. |
| 6,031,987 A | 2/2000 | Damani et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,249,291 B1 | 6/2001 | Popp et al. |
| 6,266,669 B1 | 7/2001 | Brodersen et al. |
| 6,272,537 B1 | 8/2001 | Kekic et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| 6,341,262 B1 | 1/2002 | Damani et al. |
| D454,139 S | 3/2002 | Feldcamp |
| 6,367,077 B1 | 4/2002 | Brodersen et al. |
| 6,393,386 B1 | 5/2002 | Zager et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,505,212 B2 | 1/2003 | Nakano et al. |
| 6,535,909 B1 | 3/2003 | Rust |
| 6,546,397 B1 | 4/2003 | Rempell |
| 6,549,908 B1 | 4/2003 | Loomans |
| 6,553,563 B2 | 4/2003 | Ambrose et al. |
| 6,560,461 B1 | 5/2003 | Fomukong et al. |
| 6,560,639 B1 | 5/2003 | Dan et al. |
| 6,574,635 B2 | 6/2003 | Stauber et al. |
| 6,577,726 B1 | 6/2003 | Huang et al. |
| 6,581,063 B1 | 6/2003 | Kirkman |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,636,886 B1 | 10/2003 | Katiyar et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,732,332 B1 | 5/2004 | Borysewicz et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,769,032 B1 | 7/2004 | Katiyar et al. |
| 6,782,383 B2 | 8/2004 | Subramaniam et al. |
| 6,792,454 B2 | 9/2004 | Nakano et al. |
| 6,792,475 B1 | 9/2004 | Arcuri et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,889,260 B1 | 5/2005 | Hughes |
| 6,938,050 B2 | 8/2005 | Le et al. |
| 6,957,218 B1 | 10/2005 | Wyatt |
| 6,968,372 B1 | 11/2005 | Thompson et al. |
| 6,985,927 B2 | 1/2006 | O'Brien et al. |
| 7,003,528 B2 | 2/2006 | Dan et al. |
| 7,003,777 B2 | 2/2006 | Hines |
| 7,020,722 B2 | 3/2006 | Sivier et al. |
| 7,032,225 B2 | 4/2006 | Wang et al. |
| 7,092,995 B2 | 8/2006 | Kaler et al. |
| 7,171,664 B2 | 1/2007 | Wang et al. |
| 7,246,054 B2 | 7/2007 | Szymanski et al. |
| 7,287,215 B2 | 10/2007 | Arcuri et al. |
| 7,330,722 B1 | 2/2008 | Kirtley et al. |
| 7,340,411 B2 | 3/2008 | Cook |
| 7,441,008 B2 | 10/2008 | Johnson |
| 7,451,393 B1 | 11/2008 | Herbison et al. |
| 7,620,655 B2 | 11/2009 | Larsson et al. |
| 7,627,649 B2 | 12/2009 | Saras |
| 7,752,258 B2 | 7/2010 | Lewin et al. |
| 8,190,679 B1 | 5/2012 | Gay et al. |
| 8,306,979 B2 | 11/2012 | Mao et al. |
| 8,364,540 B2 * | 1/2013 | Soroca et al. ............ 705/14.64 |
| 8,397,223 B2 | 3/2013 | Chiang |
| 8,402,427 B2 | 3/2013 | Chiang |
| 8,607,139 B2 * | 12/2013 | Alexander ................ 715/222 |
| 8,615,583 B2 | 12/2013 | Plamondon |
| 8,671,021 B2 * | 3/2014 | Maharajh et al. ......... 705/14.66 |
| 8,819,187 B1 | 8/2014 | Hofmann |
| 8,994,815 B2 * | 3/2015 | Mito et al. ................ 348/133 |
| 9,064,010 B2 * | 6/2015 | Maharajh et al. ................ 1/1 |
| 2001/0037490 A1 | 11/2001 | Chiang |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0046245 A1 | 4/2002 | Hillar et al. |
| 2002/0049697 A1 | 4/2002 | Nakano et al. |
| 2002/0059558 A1 | 5/2002 | Hines |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133561 A1 | 9/2002 | O'Brien et al. |
| 2002/0133637 A1 | 9/2002 | Popp et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0014442 A1 | 1/2003 | Shiigi et al. |
| 2003/0018705 A1 | 1/2003 | Chen et al. |
| 2003/0018830 A1 | 1/2003 | Chen et al. |
| 2003/0028517 A1 | 2/2003 | Nakano et al. |
| 2003/0050929 A1 * | 3/2003 | Bookman et al. .................. 707/7 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0093569 A1 | 5/2003 | Sivier et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0204810 A1 | 10/2003 | Dam et al. |
| 2003/0206192 A1 | 11/2003 | Chen et al. |
| 2003/0217117 A1 | 11/2003 | Dan et al. |
| 2003/0225730 A1 | 12/2003 | Warner et al. |
| 2003/0226132 A1 | 12/2003 | Tondreau et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0024578 A1 | 2/2004 | Szymanski et al. |
| 2004/0027388 A1 | 2/2004 | Berg et al. |
| 2004/0111398 A1 | 6/2004 | England et al. |
| 2004/0111728 A1 | 6/2004 | Schwalm |

(56) References Cited

U.S. PATENT DOCUMENTS

| | | |
|---|---|---|
| 2004/0117795 A1 | 6/2004 | Wang et al. |
| 2004/0123238 A1 | 6/2004 | Hefetz et al. |
| 2004/0123293 A1 | 6/2004 | Johnson |
| 2004/0128001 A1 | 7/2004 | Levin et al. |
| 2004/0167989 A1 | 8/2004 | Kline et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0230983 A1 | 11/2004 | Shi et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0005089 A1 | 1/2005 | Eckhart et al. |
| 2005/0015357 A1 | 1/2005 | Shahidi |
| 2005/0028081 A1 | 2/2005 | Arcuri et al. |
| 2005/0050555 A1 | 3/2005 | Exley et al. |
| 2005/0060687 A1 | 3/2005 | Ghazaleh et al. |
| 2005/0091026 A1 | 4/2005 | Hodgson et al. |
| 2005/0091098 A1 | 4/2005 | Brodersen et al. |
| 2005/0138086 A1 | 6/2005 | Pecht-Seibert |
| 2005/0223022 A1 | 10/2005 | Weissman et al. |
| 2005/0235256 A1 | 10/2005 | Freydl |
| 2005/0246627 A1 | 11/2005 | Sayed |
| 2006/0206599 A1 | 9/2006 | Milligan et al. |
| 2006/0212531 A1 | 9/2006 | Kikkawa et al. |
| 2006/0218180 A1 | 9/2006 | Bodlaender et al. |
| 2006/0294500 A1 | 12/2006 | Chiang |
| 2007/0061408 A1 | 3/2007 | Saras |
| 2007/0129928 A1 | 6/2007 | Lin et al. |
| 2007/0204013 A1 | 8/2007 | Castrucci |
| 2008/0010381 A1 | 1/2008 | Barraclough et al. |
| 2008/0052668 A1 | 2/2008 | Craig et al. |
| 2008/0140759 A1 | 6/2008 | Conner et al. |
| 2008/0140760 A1 | 6/2008 | Conner et al. |
| 2008/0140857 A1 | 6/2008 | Conner et al. |
| 2008/0172608 A1 | 7/2008 | Patrawala et al. |
| 2008/0207182 A1* | 8/2008 | Maharajh et al. .......... 455/414.1 |
| 2008/0288451 A1 | 11/2008 | Jiang et al. |
| 2008/0288608 A1 | 11/2008 | Johnson |
| 2008/0290987 A1 | 11/2008 | Li |
| 2009/0037460 A1 | 2/2009 | Medicke et al. |
| 2009/0106356 A1 | 4/2009 | Brase et al. |
| 2009/0150518 A1* | 6/2009 | Lewin et al. .................. 709/219 |
| 2009/0248793 A1 | 10/2009 | Jacobsson et al. |
| 2010/0017368 A1 | 1/2010 | Mao et al. |
| 2010/0095197 A1 | 4/2010 | Klevenz et al. |
| 2010/0185614 A1 | 7/2010 | O'Brien et al. |
| 2010/0250599 A1 | 9/2010 | Schmidt et al. |
| 2010/0325583 A1 | 12/2010 | Aarni et al. |
| 2011/0071901 A1* | 3/2011 | Fries ........................ 705/14.48 |
| 2011/0276664 A1 | 11/2011 | Prahlad et al. |
| 2012/0010995 A1 | 1/2012 | Skirpa et al. |
| 2012/0011167 A1 | 1/2012 | Schmidt |
| 2012/0174064 A1 | 7/2012 | Polly et al. |
| 2014/0089459 A1 | 3/2014 | Werr |

OTHER PUBLICATIONS

Office Action for U.S. Appl. No. 12/895,715 mailed Oct. 12, 2012, 18 pages.
Notice of Allowance for U.S. Appl. No. 12/895,713 mailed Jun. 25, 2013, 18 pages.
Office Action for Canadian Patent Application No. 2720897 mailed Dec. 16, 2013, 3 pages.
Notice of Allowance for U.S. Appl. No. 12/935,890 mailed Feb. 12, 2014, 15 pages.
Examination Report for European Patent Application No. 09737586.9 mailed Nov. 14, 2013, 6 pages.
Atterer, et al., "Tracking the Interaction of Users with AJAX Applications for Usability Testing," Apr./May 2007, ACM, p. 1347-1350.
Chen, et al., "Function-Based Object Model Towards Website Adaptation," May 2001, ACM, p. 587-596.
International Search Report and Written Opinion for PCT/CA2009/000569 mailed Jul. 27, 2009, 10 pages.
International Preliminary Report on Patentability for PCT/CA2009/000569 mailed Nov. 11, 2010, 8 pages.
Non-Final Office Action for U.S. Appl. No. 14/283,028, mailed Mar. 18, 2015, 21 pages.
Final Office Action for U.S. Appl. No. 14/592,804, mailed Jul. 9, 2015, 13 pages.
Notice of Allowance for U.S. Appl. No. 14/283,028, mailed Jul. 8, 2015, 16 pages.
Office Action for U.S. App. No. 13/248,459, mailed Mar. 7, 2013, 10 pages.
Office Action for U.S. Appl. No. 13/248,459, mailed Apr. 18, 2014, 12 pages.
Final Office Action for U.S. Appl. No. 13/248,459, mailed Sep. 30, 2013, 11 pages.
Notice of Allowance for U.S. Appl. No. 13/248,459, mailed Sep. 9, 2014, 10 pages.
Non-Final Office Action for U.S. Appl. No. 13/310,525, mailed Oct. 10, 2014, 28 pages.
Non-Final Office Action for U.S. Appl. No. 14/592,804, mailed Mar. 27, 2015, 14 pages.
Final Office Action for U.S. Appl. No. 13/310,525, mailed Apr. 22, 2015, 24 pages.
Notice of Allowance for U.S. Appl. No. 12/935,890, mailed May 15, 2014, 2 pages.
Non-Final Office Action for U.S. Appl. No. 12/935,890, mailed Jul. 9, 2013, 26 pages.
Notice of Allowance for U.S. Appl. No. 12/935,890, mailed Feb. 12, 2014, 15 pages.
Non-Final Office Action for U.S. Appl. No. 12/935,890, mailed Jan. 28, 2013, 16 pages.

* cited by examiner

DEVICE ABSTRACTION FOR PAGE GENERATION

CLAIM OF PRIORITY

This application claims the benefit of U.S. Provisional Patent Application 61/419,611, entitled "A CONTENT MANAGEMENT SYSTEM FOR DEVELOPING AND INTERACTING WITH WEBSITES," by Philip Calvin, et al., filed Dec. 3, 2010, the entire contents of which is incorporated herein by reference.

This application is a continuation-in-part of U.S. patent application Ser. No. 12/935,890, entitled "OBJECT-ORIENTED SYSTEM FOR CREATING AND MANAGING WEBSITES AND THEIR CONTENT," by Philip Calvin, filed Sep. 30, 2010, the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Described herein are techniques for providing more efficient generation of pages to be provided to a requesting device. More particularly, these techniques abstract destination devices and types in a manner to provide more consistent, efficient page generation.

BACKGROUND

Entities that provide content in the form of pages (e.g., Web pages, social networking site content) often provide the content to multiple targets as well as multiple devices types (e.g., computer system, mobile device, smartphone), each of which may require different rendering and layout details and restrictions. For example, a web site may allocate enough space on a page to allow the content to be displayed utilizing the full height and width of a typical computer display. A social networking site, in contrast, may only provide a portion of a full page for the content to be displayed. Also, the social networking site may require use of site-specific APIs in order for the content to display and render properly.

There are two common solutions utilized by content management systems (CMSs). They are to write multiple sets of source files, one for each target site, and provide post-processing to dynamically assemble content to suit the target site. Writing multiple sets of source files can be time consuming and expensive. Post processing generally relies on a best guess of what would be best for the target site. Thus, neither of these solutions provides a reliable and efficient result.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques to allow page content to be configured for each target site. In one embodiment, the configuration is persisted as a unique target object that can be applied to any set of content within a page. When a request comes to the content server, the server may determine the source of the request (e.g., corporate web page, social networking, mobile device). The server can dynamically assemble the correct response by wrapping the requested content into the specified target object that is compatible with the source of the request.

In one embodiment, the server determines the device generating the request (e.g., laptop computer system, tablet device, smartphone, notepad device) and dynamically assembles the correct response by wrapping the requested content into the specified target object that is compatible with the source of the request. In one embodiment, the source of the request, whether a web site or a physical device, is treated as a requesting object that has an associated response format. That is, the concept of the requesting source (device or site) can be abstracted to be treated in the same manner, which may provide a more efficient page delivery process.

In one embodiment, the target object may define which page to display (content), as well as a style sheet and assets to be used for the target site. In this way, the server can dynamically publish the same content in different rendering formats depending on the intended agent. If a content target (e.g., social networking site) changes a format or how dynamic content is hosted, the target object in the CMS may be updated. In one embodiment, the CMS may be updated using a what-you-see-is-what-you-get (WYSISYG) tool that requires no coding. This saves costs and reduces system complexity.

Figure 1:
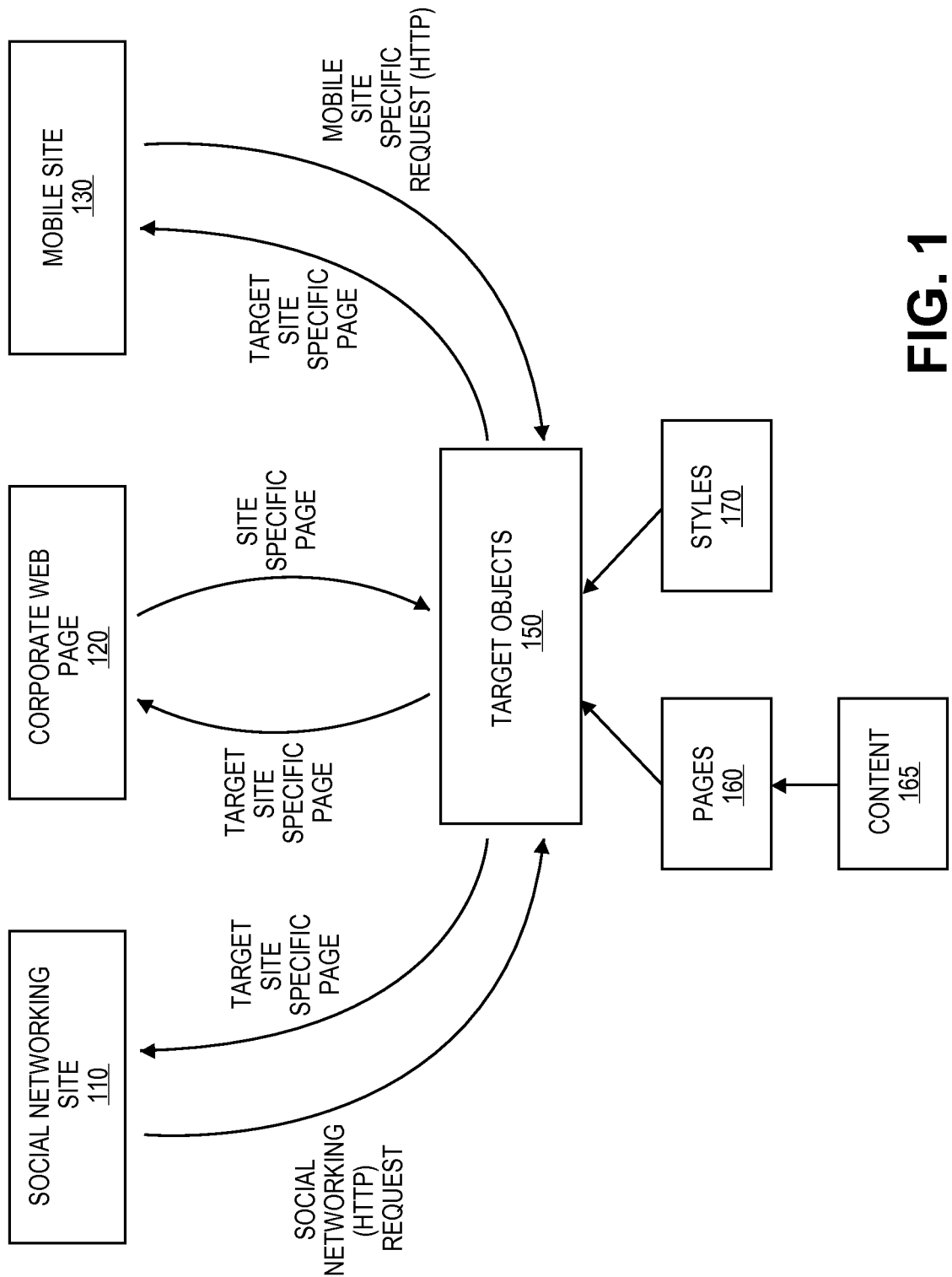
FIG. 1 is a conceptual diagram of a technique for dynamically providing content based on request source type.

FIG. 1 is a conceptual diagram of a technique for dynamically providing content based on request source type. The example of FIG. 1 describes requests from three types of sites; however, other types of sites may be supported as well.

As discussed above, social networking sites (e.g., Facebook, MySpace, Zoosk, LinkedIn) may have formatting and/or rendering requirements that are unique to the site or requirements that differ from a main page provided by the entity providing content (e.g., a corporate web page). Thus, social networking site 110, corporate web page 120 and mobile site 130 may each have different formatting and/or rendering requirements.

Each of social networking site 110, corporate web page 120 and mobile site 130 may provide requests that are specific to the type of site generating the request. The examples of FIG. 1 generally correspond to categories of sites. For example, social networking site 110 may be, Facebook or LinkedIn, each of which may have a different request that is provided to the server. In one embodiment, the request may be in the form of a HyperText Transfer Protocol (HTTP) request; however other protocols may be supported as well.

A server, or other device responding to the request, may utilize target objects 150 to generate a response that includes a dynamically assembled page specific to the source of the request. In one embodiment, target objects 150 includes an object for each type of target device/site. The target objects allow the server to dynamically assemble the correct response (e.g., correct content, formatting, rendering) by wrapping the requested content into the target object that is compatible with the source of the request.

The content information may include one or more of style information (from styles 170), page and content information (from pages 160 and/or content 165) as well as any other relevant information. Use of the target objects to dynamically assemble the page to be served allows the server to adapt content and styles to different requesting sites without requiring rewriting of the page to be provided.

The content wrapped with the target object can then be provided to the requesting site as a target site specific page, which may be different for each type of site. For example, a mobile site may have fewer images than a corporate site and a social networking site may have less content than the corporate site.

Figure 2:
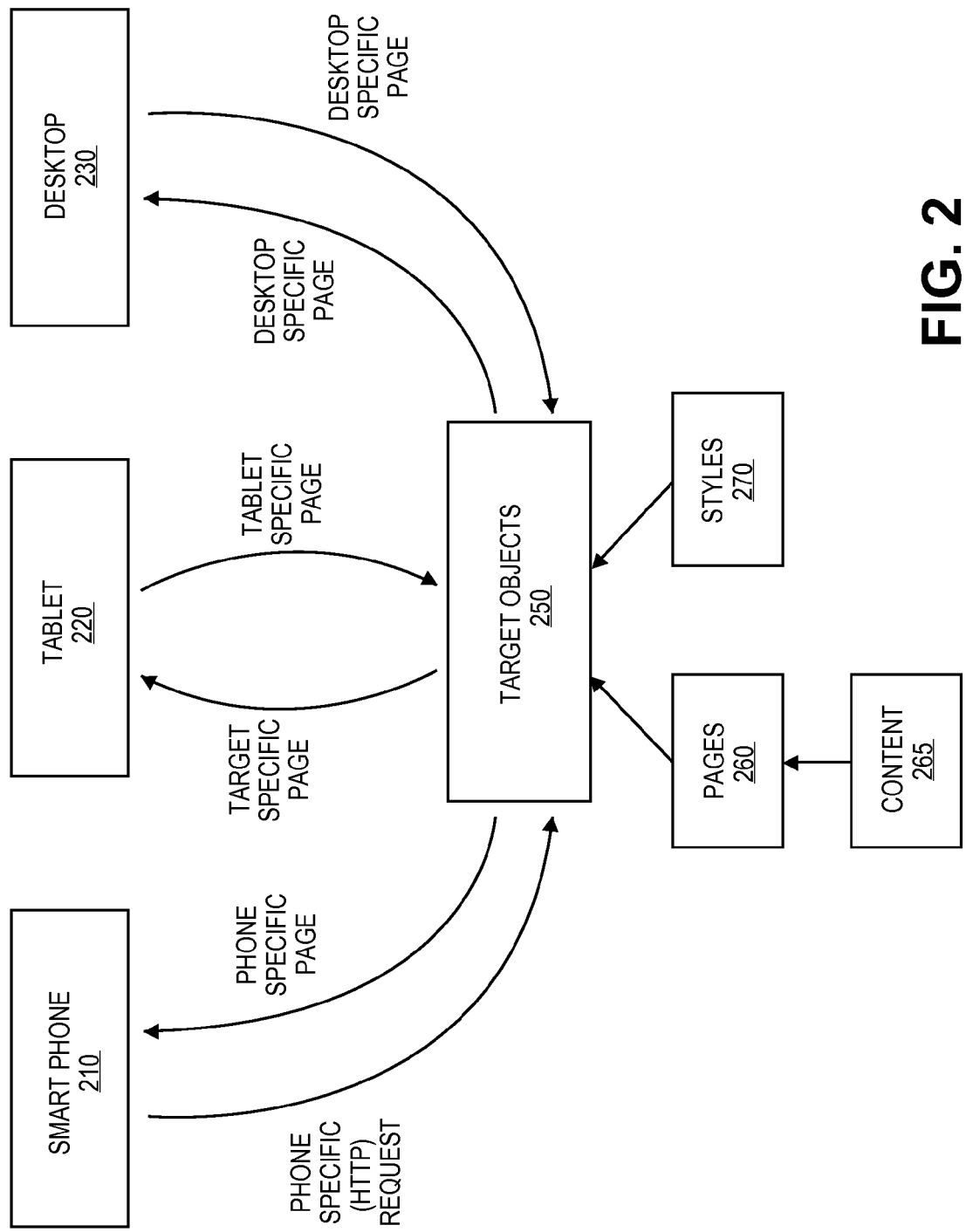
FIG. 2 is a conceptual diagram of a technique for dynamically providing content based on request device type.

FIG. 2 is a conceptual diagram of a technique for dynamically providing content based on request device type. The example of FIG. 1 describes requests from three types of sites; however, other types of sites may be supported as well.

As discussed above, different types of devices (e.g., laptop computers, desktop computers, tablet devices, smartphones) may have formatting and/or rendering requirements that are unique to the site or requirements that differ from each other. Thus, smartphone 210, tablet 220 and desktop 230 may each have different formatting and/or rendering requirements.

Each of smartphone 210, tablet 220 and desktop 230 may provide requests that are specific to the type of device generating the request. The examples of FIG. 2 generally correspond to categories of sites. For example, smartphone 210 may be, a phone with an Apple operating system or a phone with an Android operating system, each of which may have a different request that is provided to the server. In one embodiment, the request may be in the form of a HyperText Transfer Protocol (HTTP) request; however other protocols may be supported as well.

A server, or other device responding to the request, may utilize target objects 250 to generate a response that includes a dynamically assembled page specific to the source of the request. In one embodiment, target objects 250 includes an object for each type of target device. The target objects allow the server to dynamically assemble the correct response (e.g., correct content, formatting, rendering) by wrapping the requested content into the target object that is compatible with the source of the request.

The content information may include one or more of style information (from styles 270), page and content information (from pages 260 and/or content 265) as well as any other relevant information. Use of the target objects to dynamically assemble the page to be served allows the server to adapt content and styles to different requesting sites without requiring rewriting of the page to be provided.

The content wrapped with the target object can then be provided to the requesting site as a target site specific page, which may be different for each type of site. For example, a mobile site may have fewer images than a corporate site and a social networking site may have less content than the corporate site.

Figure 3:
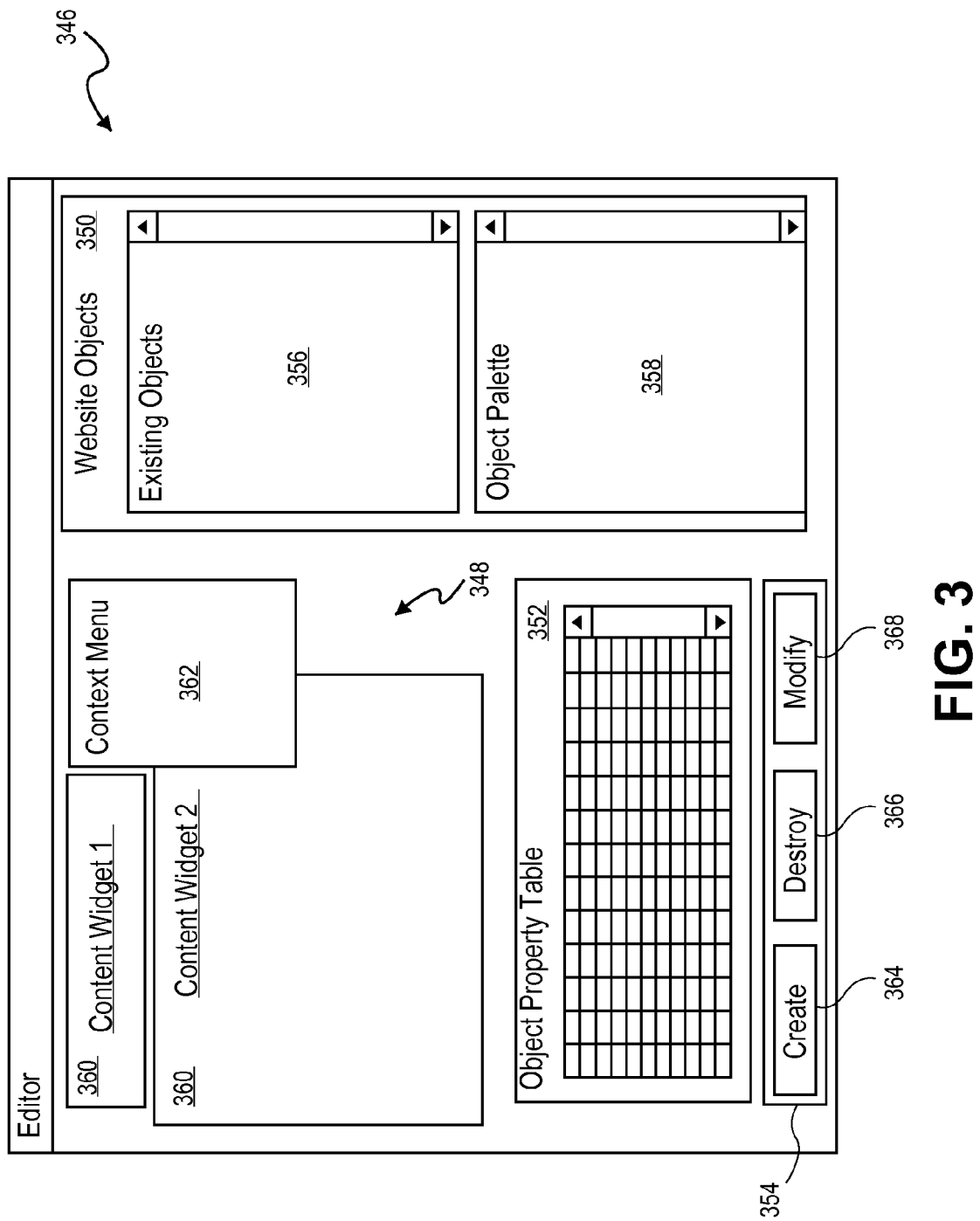
FIG. 3 shows a graphical user interface of an object editor that may be used to manage target objects.

FIG. 3 shows a graphical user interface of an object editor that may be used to manage target objects. The example of FIG. 3 provides an example of a WYSIWYG editor that may be utilized to edit target objects and other elements of pages that may be provided using the techniques described herein. The WYSIWYG editor may allow a non-programmer to update and/or design a page in order to provide the ability to more efficiently update pages to be provided in response to requests.

Object editor component 354, presented by the browser component 328 on the creator's client or the manager's client, with the assistance of the editor applet component 350 if one exists, to enable the creator or manager to interact with the object editor component 354 on the system 320 sever via the web server 330 for the purpose of creating, modifying or destroying objects instantiating classes in the Website package 360 to create or manage a website.

The GUI 346 includes four main regions, a WYSIWYG design region 348, an objects catalog region 350, an object property table region 352, and a button pad region 354.

The catalog region includes an existing objects list 356 that catalogs all objects that currently exist to represent aspects of the website and an object palette 358 that catalogs all available classes for representing aspects of a website for which objects may be instantiated.

The design region 348 provides a "what-you-see-is-what-you-get" area for laying out the presentation aspects of a portion of a website, for example placing and sizing content item objects 360 ("widgets"). A context menu 362 may be available to conveniently set various common properties of a selected one of the content item objects 360.

The object property table 352 provides a way to inspect and modify the properties of a selected object, including objects that may not be conveniently represented in the design region 348 such as objects instantiating classes in the logic tier package 388 or the storage tier package 390.

The button pad region 354 provides a create button 364, a destroy button 366 and a modify button 368. The create button 364 instantiates an object selected from the object palette 358 and presents it for inspection and modification in the object property table 352. The destroy button 366 destroys the selected object. The modify button 368 presents the selected object in the object property table 352 from inspection and modification.

Figure 4:
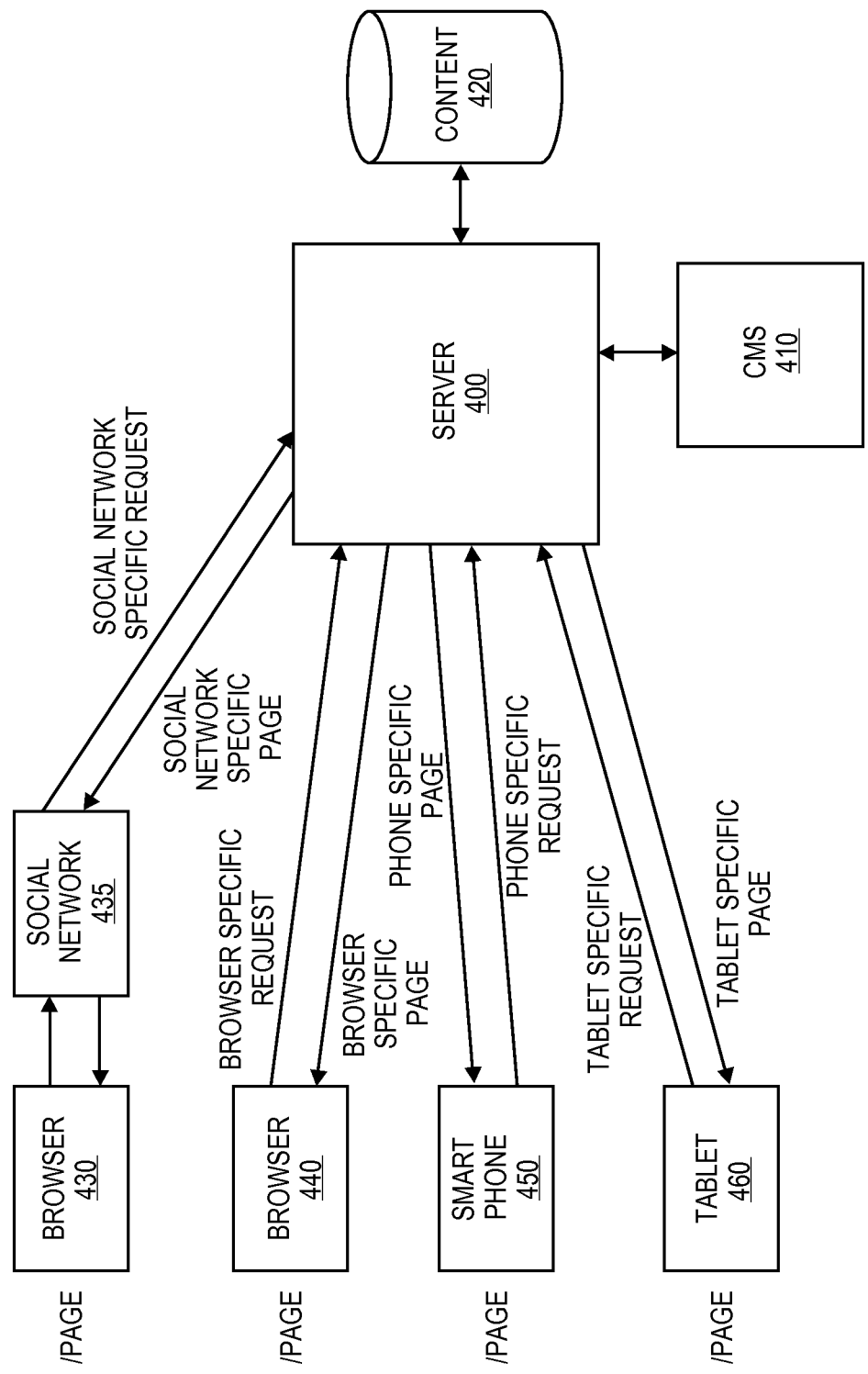
FIG. 4 is a block diagram of one embodiment of a server that may dynamically provide content based on request source type.

FIG. 4 is a block diagram of one embodiment of a server that may dynamically provide content based on request source type. Server 400 may be any type of server device (or multiple server devices) that may operate as described above to utilize target objects to dynamically provide content as described herein. In one embodiment, server 400 operates within a multitenant environment to provide dynamically constructed pages. Embodiments of multitenant environments are described in greater detail below.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

With respect to the examples provided herein, and particularly to the examples of FIG. 4, requesting sources (e.g., social networking sites, browser types) are treated as "devices" for purposes of dynamic page construction. That is, various targets (e.g., smart phone, browser, social networking site) may each be treated as a "device" for purposes of dynamically constructing a web page. Server 400 may then build the page based on metadata stored on the server and context information from the request. This provides a more consistent and more modifiable web page that can more easily be kept up to date and provide a more consistent user experience.

During operation, a user may utilize browser 430 to access social network 435, which may display a page dynamically constructed by server 400 utilizing CMS 410 and content 420. Under these conditions server 400 may operate to dynamically construct the page as described with respect to social networking site 100 of FIG. 1. If the user requests the page using browser 440, without accessing a site that has specific content requirements, browser 440 may display a page dynamically constructed by server 400 utilizing CMS 410 and content 420. Under these conditions server 400 may operate to dynamically construct the page as described with respect to corporate web page 120 or mobile site 130 of FIG. 1, whichever is appropriate.

If the user requests the page using smart phone 450, a browser on smart phone 450 may display a page dynamically constructed by server 400 utilizing CMS 410 and content 420. Under these conditions server 400 may operate to dynamically construct the page as described with respect to smart phone 210 of FIG. 2. Similarly, If the user requests the page using tablet 460, a browser on tablet 460 may display a page dynamically constructed by server 400 utilizing CMS 410 and content 420. Under these conditions server 400 may operate to dynamically construct the page as described with respect to tablet 220 of FIG. 2.

Figure 5:
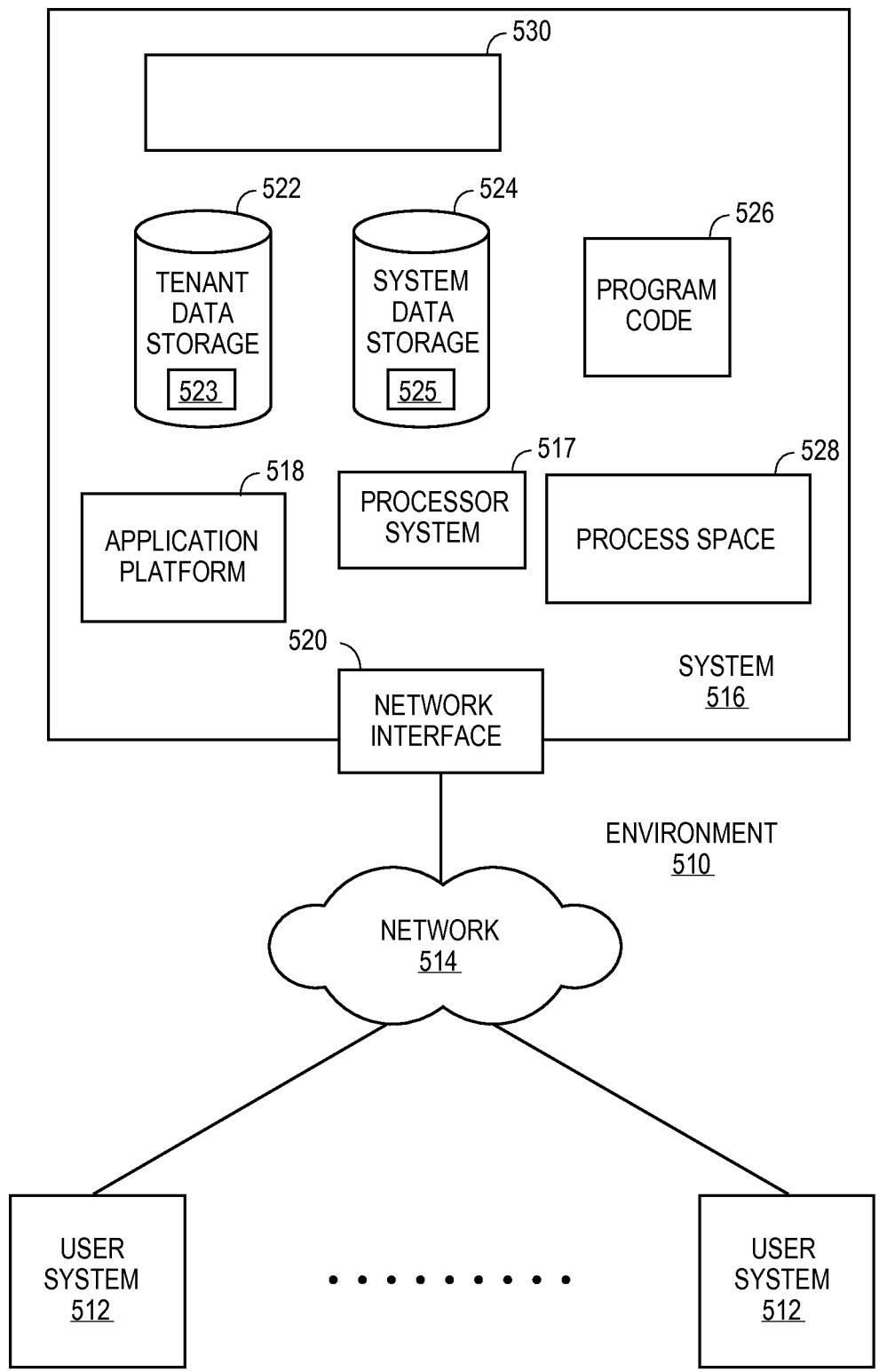
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 18, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 5) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein.

A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514.

Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
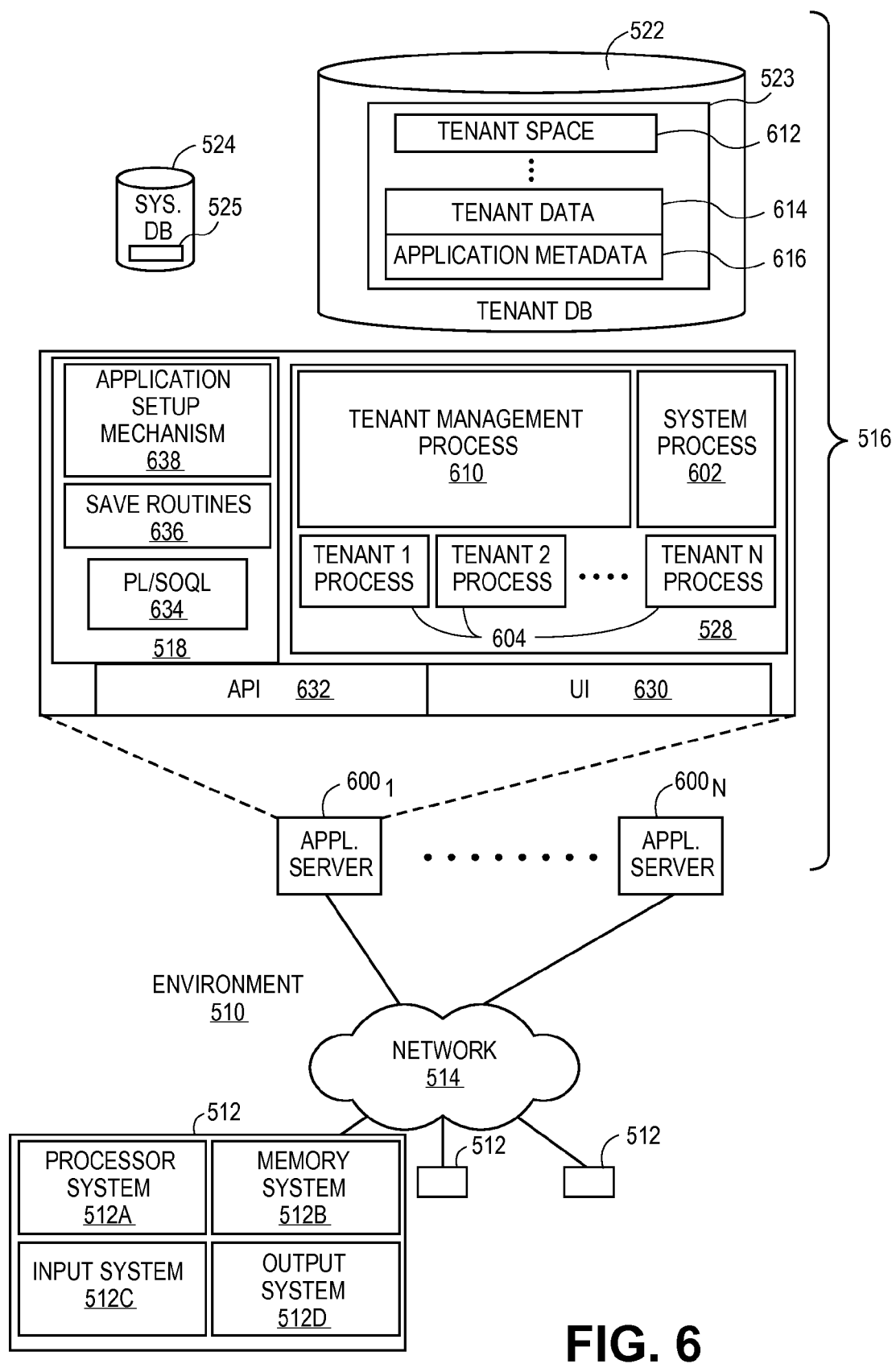
FIG. 6 illustrates a block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$500_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks.

As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632.

A detailed description of some PL/SOQL language embodiments is discussed in commonly owned co-pending U.S. Provisional Patent Application 50/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 5, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600.

In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving a request for information to be provided as a page of content, the page provided by a server device communicatively coupled to receive the request from a remote requesting device;
   determining a requesting source generating the request, wherein the requesting source comprises a requesting physical device or a requesting site;
   dynamically constructing the page of content in response to the request based on the requesting source metadata stored on the server device and context information corresponding to the request by dynamically assembling a response comprising wrapping the page of content into a specified target object that is compatible with the requesting source, wherein the specified target object is selected from a plurality of target objects corresponding to the requesting physical device or the requesting site;
   transmitting the dynamically constructed page of content to the requesting device.

2. The method of claim 1 wherein the server device provides a plurality of hierarchical classes of objects, each of the classes representing one characteristic of the page, and the classes of objects are stored as a traversable tree that is utilized to dynamically construct the page.

3. The method of claim 2 wherein the characteristic comprises one of a storage requirement, a rendering requirement, and logic to be provided by the page.

4. The method of claim 1 wherein the context information comprises a device type of the remote requesting device and a site through which the request is generated.

5. The method of claim 4 wherein the device type and the source type are represented by a single object type.

6. The method of claim 1 wherein dynamically constructing the page of content in response to the request based on metadata stored on the server device and context information corresponding to the request comprises dynamically assembling the page by wrapping requested content into a specified target object that is compatible with the remote requesting device.

7. The method of claim 1 wherein the server device is part of a database environment comprising a multitenant database environment, wherein the multitenant database environment stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

8. A system comprising:
   a content storage system; a server coupled with the content storage system, the server to receive a request for information to be provided as a page of content, the page provided by a server device communicatively coupled to receive the request from a remote requesting device, to determine a requesting source generating the request, wherein the requesting source comprises a requesting physical device or a requesting site, to dynamically construct the page of content in response to the request based on the requesting source metadata stored on the server device and context information corresponding to the request by dynamically assembling a response comprising wrapping the page of content into a specified target object that is compatible with the requesting source, wherein the specified target object is selected from a plurality of target objects corresponding to the requesting physical device or the requesting site, and to transmit the dynamically constructed page of content to the requesting device.

9. The system of claim 8 wherein the content storage system comprises at least a content management system.

10. The system of claim 8 wherein the server manages a plurality of hierarchical classes of objects, each of the classes representing one characteristic of the page, and the classes of objects are stored as a traversable tree that is utilized to dynamically construct the page.

11. The system of claim 10 wherein the characteristic comprises one of a storage requirement, a rendering requirement, and logic to be provided by the page.

12. The system of claim 8 wherein the context information comprises a device type of the remote requesting device and a site through which the request is generated.

13. The system of claim 12 wherein the device type and the source type are represented by a single object type.

14. The system of claim 8 wherein dynamically constructing the page of content in response to the request based on metadata stored on the server device and context information corresponding to the request comprises dynamically assembling the page by wrapping requested content into a specified target object that is compatible with the remote requesting device.

15. The system of claim 8 wherein the server is part of a database environment comprising a multitenant database environment, wherein the multitenant database environment stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

16. An article comprising a non-transitory computer-readable medium having stored thereon instructions that, when executed by one or more processors, cause the one or more processors to:
receive a request for information to be provided as a page of content, the page provided by a server device communicatively coupled to receive the request from a remote requesting device;
determine a requesting source generating the request, wherein the requesting source comprises a requesting physical device or a requesting site;
dynamically construct the page of content in response to the request based on the requesting source metadata stored on the server device and context information corresponding to the request by dynamically assembling a response comprising wrapping the page of content into a specified target object that is compatible with the requesting source, wherein the specified target object is selected from a plurality of target objects corresponding to the requesting physical device or the requesting site;
transmit the dynamically constructed page of content to the requesting device.

17. The article of claim 16 wherein the server device provides a plurality of hierarchical classes of objects, each of the classes representing one characteristic of the page, and the classes of objects are stored as a traversable tree that is utilized to dynamically construct the page.

18. The article of claim 17 wherein the characteristic comprises one of a storage requirement, a rendering requirement, and logic to be provided by the page.

19. The article of claim 16 wherein the context information comprises a device type of the remote requesting device and a site through which the request is generated.

20. The article of claim 19 wherein the device type and the source type are represented by a single object type.

21. The article of claim 16 wherein dynamically constructing the page of content in response to the request based on metadata stored on the server device and context information corresponding to the request comprises dynamically assembling the page by wrapping requested content into a specified target object that is compatible with the remote requesting device.

22. The article of claim 16 wherein the server device is part of a database environment comprising a multitenant database environment, wherein the multitenant database environment stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

23. An apparatus comprising: means for receiving a request for information to be provided as a page of content, the page provided by a server device communicatively coupled to receive the request from a remote requesting device;
means for determining a requesting source generating the request, wherein the requesting source comprises a requesting physical device or a requesting site;
means for dynamically constructing the page of content in response to the request based on the requesting source metadata stored on the server device and context information corresponding to the request by dynamically assembling a response comprising wrapping the page of content into a specified target object that is compatible with the requesting source, wherein the specified target object is selected from a plurality of target objects corresponding to the requesting physical device or the requesting site;
means for transmitting the dynamically constructed page of content to the requesting device.

24. The apparatus of claim 23 wherein the means for dynamically constructing the page of content in response to the request based on metadata stored on the server device and context information corresponding to the request comprises means for dynamically assembling the page by wrapping requested content into a specified target object that is compatible with the remote requesting device.

* * * * *